(12) United States Patent
Baheti (10) Patent No.: US 10,215,287 B2
(45) Date of Patent: Feb. 26, 2019

(54) SEAL ASSEMBLY WITH DEFLECTABLE SEALING MEMBER

(71) Applicant: Sanjay Kumar Baheti, Brookeville, MD (US)

(72) Inventor: Sanjay Kumar Baheti, Brookeville, MD (US)

(73) Assignee: Kaydon Ring & Seal, Inc., Baltimore ( * ) Notice: Subject to any disclaimer, the term of this patent is extended or adjusted under 35 U.S.C. 154(b) by 236 days.

(21) Appl. No.: 15/173,757

(22) Filed: Jun. 6, 2016

(65) Prior Publication Data

US 2017/0350511 A1    Dec. 7, 2017

(51) Int. Cl.
 *F16J 15/38*    (2006.01)
 *F16J 15/16*    (2006.01)

(52) U.S. Cl.
 CPC ............ *F16J 15/38* (2013.01); *F16J 15/164* (2013.01)

(58) Field of Classification Search
 CPC .. F16J 15/441; F16J 15/16; F16J 15/38; F16J 15/164
 USPC ....................................................... 277/422
 See application file for complete search history.

(56) References Cited

U.S. PATENT DOCUMENTS

| | | | | |
|---|---|---|---|---|
| 3,813,103 A | * | 5/1974 | Wiese | F16J 15/3412 277/361 |
| 4,114,900 A | * | 9/1978 | Wiese | F16J 15/3432 277/361 |
| 4,511,149 A | * | 4/1985 | Wiese | F16J 15/3468 277/388 |
| 2003/0071422 A1 | * | 4/2003 | Holder | F16J 15/442 277/348 |

* cited by examiner

*Primary Examiner* — Nathan Cumar
(74) *Attorney, Agent, or Firm* — Mark Ussai; SKF USA Inc. Patent Dept.

(57) ABSTRACT

A seal assembly is for sealing about a shaft rotatable about a central axis and includes a generally annular seal disposable about the shaft. The seal has a first axial end exposable to a higher pressure fluid, an opposing second axial end exposable to a lower pressure fluid, an outer circumferential surface exposable to the higher pressure fluid and an inner circumferential sealing surface. The inner sealing surface extends about the shaft to define an annular clearance space between the shaft outer surface and the seal inner surface, which provides a flow path between the seal axial ends. The seal is configured such that a differential of at least a predetermined magnitude between fluid pressure on the seal outer surface and fluid pressure on the seal inner surface deflects at least the seal second axial end radially inwardly to reduce the volume of the clearance space.

14 Claims, 8 Drawing Sheets

SEAL ASSEMBLY WITH DEFLECTABLE SEALING MEMBER

BACKGROUND OF THE INVENTION

The present invention relates to seals and more particularly to oil seal assemblies for compressors.

Compressors typically have at least a primary seal and a secondary seal to isolate process gas from the ambient environment. The primary seal is often a radial face seal between the process gas chamber and a high pressure oil chamber, the oil being effective to isolate the process gas from reaching atmosphere. The secondary seal is typically a circumferential seal disposed about the compressor shaft (or runner on a shaft) that seals between the oil chamber and atmosphere or air.

SUMMARY OF THE INVENTION

In one aspect, the present invention is a seal assembly for sealing about a shaft rotatable about a central axis, the shaft having an outer surface. The seal assembly comprises a generally annular seal disposable about the shaft and having a first axial end exposable to a relatively higher pressure fluid, an opposing second axial end exposable to a relatively lower pressure fluid, an outer circumferential surface exposable to the higher pressure fluid and an inner circumferential sealing surface. The inner sealing surface extends circumferentially about the shaft so as to define a generally annular clearance space between the shaft outer surface and the seal inner surface. The clearance space provides a flow path between the seal first and second axial ends. The seal is configured such that a differential of at least a predetermined magnitude between fluid pressure on the seal outer surface and fluid pressure on the seal inner surface deflects at least the seal second axial end radially inwardly to reduce the volume of the clearance space.

In another aspect, the present invention is again a seal assembly for sealing about a shaft rotatable about a central axis, the shaft extending between a high pressure fluid and a low pressure fluid. The seal assembly comprises a generally annular seal disposable about the shaft and having a first end exposable to the high pressure fluid, an opposing second end exposable to the low pressure fluid, an inner circumferential sealing surface extending circumferentially about the shaft so as to define a generally annular clearance space between the shaft outer surface and the seal inner surface, and an opposing outer circumferential surface. The seal has a radial thickness defined between the inner and outer surfaces, the radial thickness being sized such that at least the seal second axial end deflects radially inwardly when pressure on the seal outer circumferential surface is at least a predetermined pressure.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-13 a seal assembly 10 for sealing about a shaft 1 rotatable about a central axis $A_S$ and having an outer surface 2. The seal assembly 10 is preferably a bushing-type seal that basically comprises a generally annular seal 12 having a central axis $A_C$ and being disposable about the shaft 1. The seal 12 has first and second axial ends 14, 16, an outer circumferential surface 18, an opposing inner circumferential sealing surface 20, and a radial thickness $t_R$ defined between the outer and inner surfaces 18, 20, respectively. The seal first axial end 14 is exposable to a relatively higher pressure fluid $F_H$, which is preferably a type of oil, the opposing second axial end 16 is exposable to a relatively lower pressure fluid $F_L$, preferably ambient air, and the seal outer circumferential surface 18 is exposable to the higher pressure fluid $F_H$. Further, the inner circumferential sealing surface 20 extends circumferentially about the shaft 1 so as to define a generally annular clearance space $S_C$ between the shaft outer surface 2 and the seal inner surface 20.

The clearance space $S_C$ provides a flow path $p_F$ between the seal first and second axial ends 14, 16, extending between an inlet opening 21 at the seal first axial end 14 and an outlet opening 23 at the second axial end 16. The flow path $p_F$ allows a certain amount of the higher pressure fluid $F_H$ to flow into the clearance space $S_C$ to provide lubrication between the seal 12 and the shaft 1. For many intended applications, the shaft 1 preferably includes a generally tubular sleeve or "runner" 3 mounted on the shaft 1 and having an outer surface 4 providing the shaft surface 2, such that seal 12 is disposed about the runner 3 and the clearance space $S_C$ is defined between the rotatable runner 3 and the fixed or "static" seal 12. However, the seal 12 may alternatively be disposed directly about the shaft 2 without any intermediate runner/sleeve.

Figure 7:
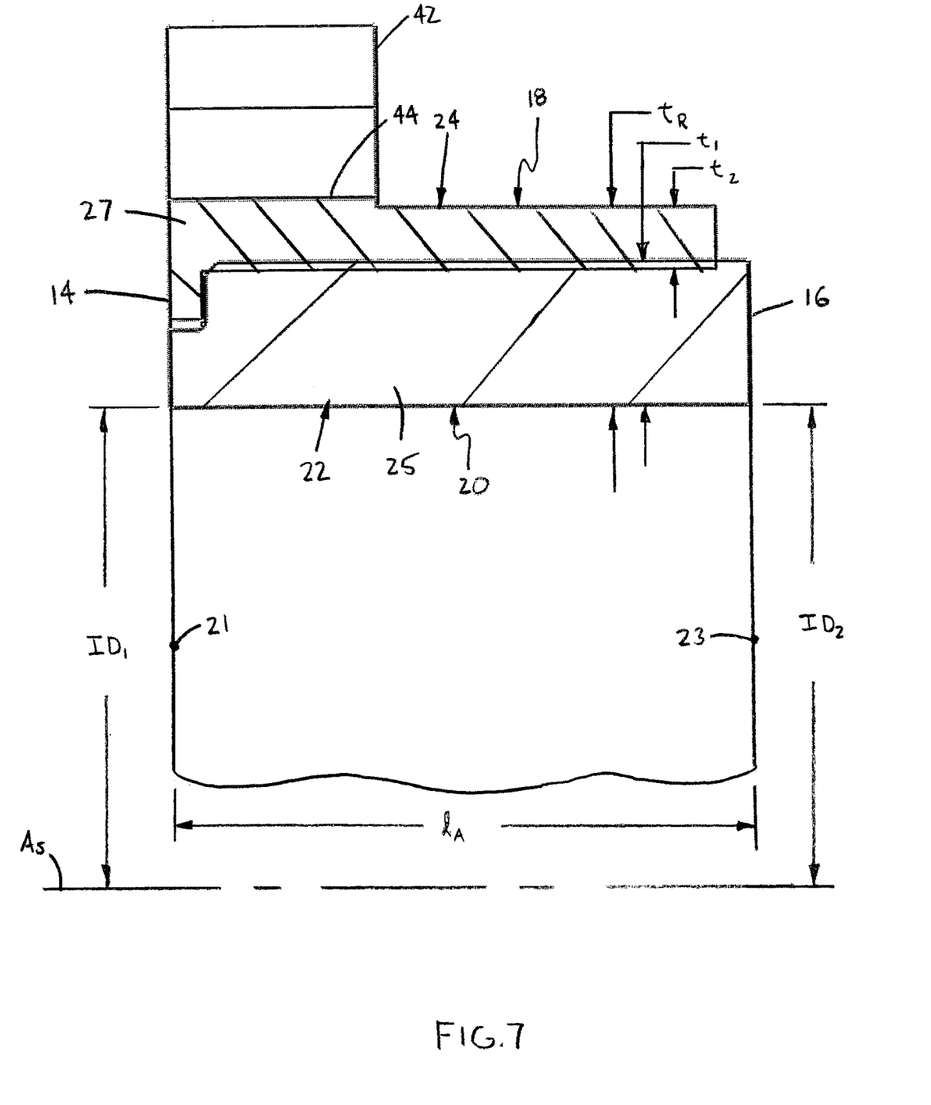
FIG. 7 is a broken-away enlarged axial view of the upper portion of the seal, shown separate from a shaft.
Figure 8:
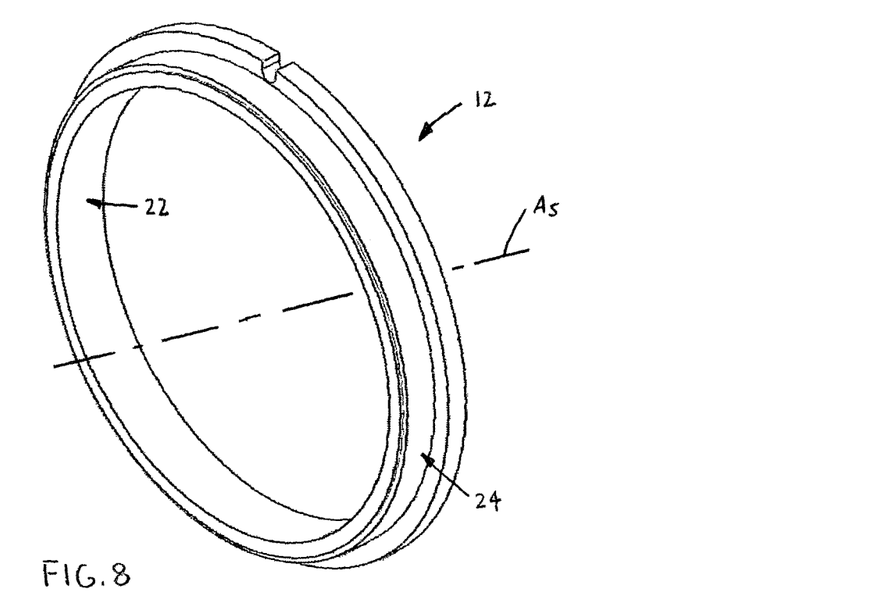
FIG. 8 is rear perspective view of the seal.
Figure 9:
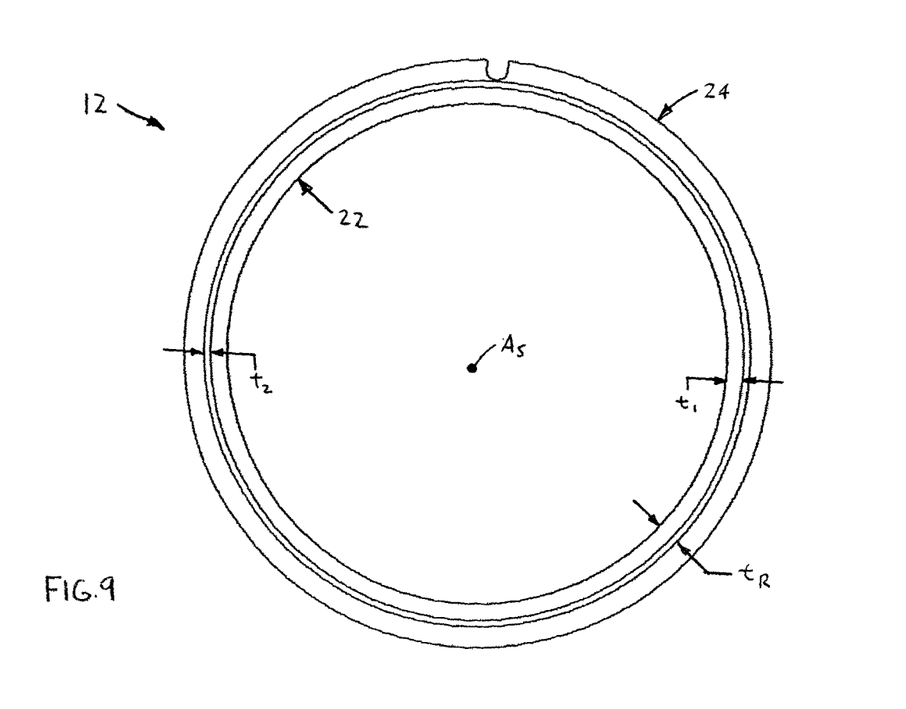
FIG. 9 is a rear plan view of the seal.
Figure 10:
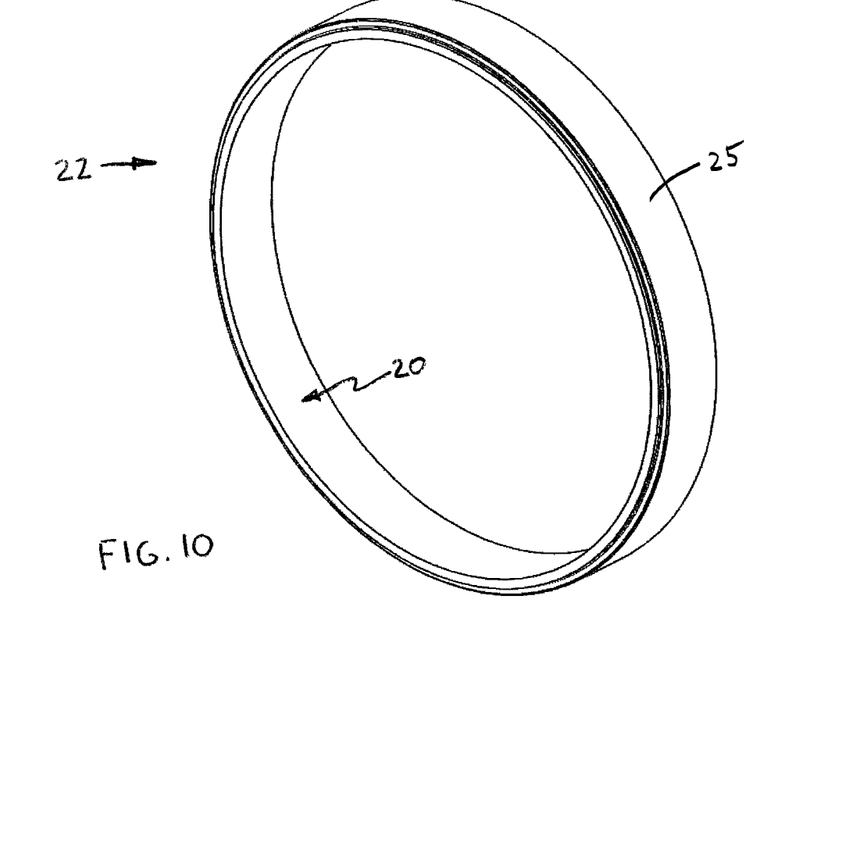
FIG. 10 is front perspective view of an inner body portion of the seal.
Figure 11:
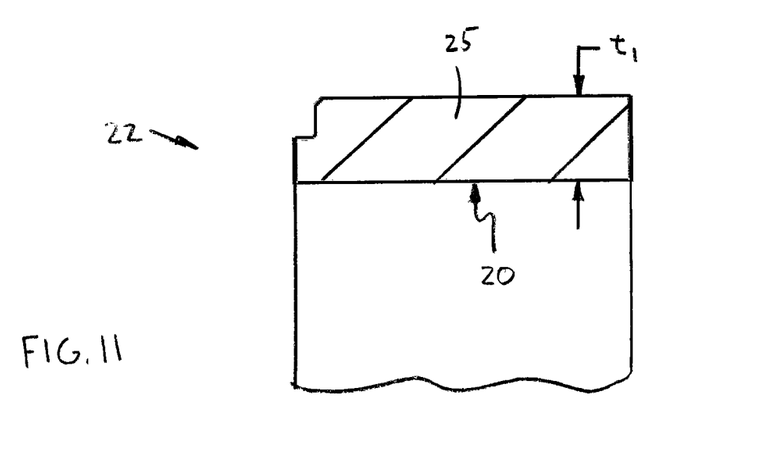
FIG. 11 is a broken-away enlarged axial view of the upper portion of the inner body portion of the seal.
Figure 12:
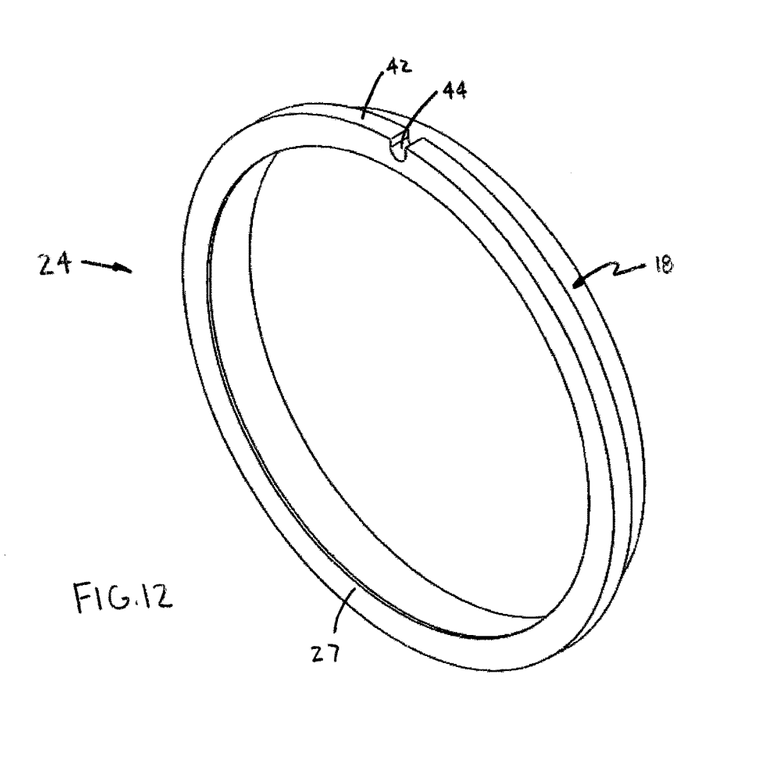
FIG. 12 is front perspective view of an outer body portion of the seal.
Figure 13:
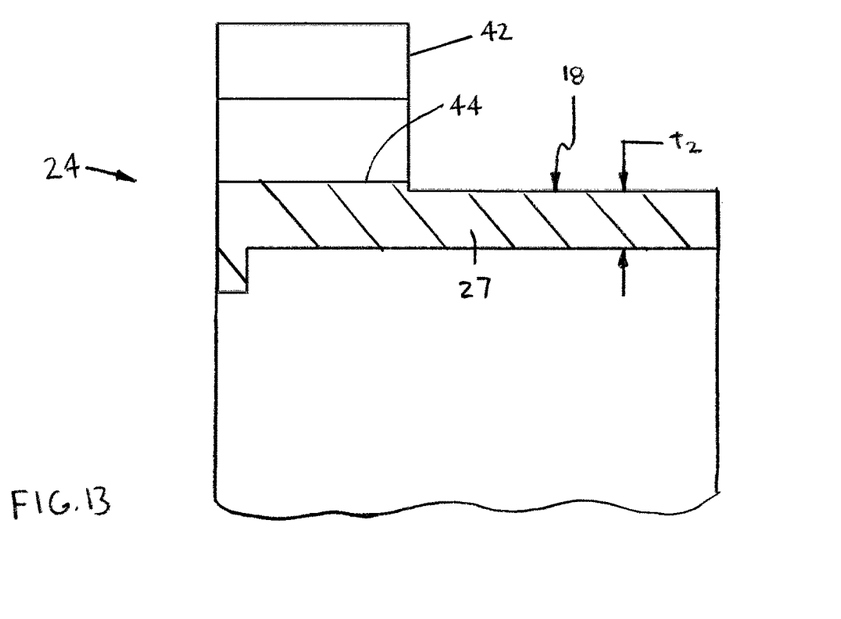
FIG. 13 is a broken-away enlarged axial view of the upper portion of the outer body portion of the seal.

Referring particularly to FIG. 7, the seal inner surface 20 preferably tapers radially inwardly, most preferably very slightly, from a first, relatively larger inner diameter $ID_1$ at the inlet opening 21 at the first axial end 14 and a second, relatively smaller inner diameter $ID_2$ at the outlet opening 23 at the seal second axial end 16, most preferably substantially linearly such that the inner surface 20 is slightly frustoconical. As such, fluid flow through the flow path $p_F$ tends to generally center the seal 12 about the shaft central axis $A_C$. Specifically, any tendency for a section of the inner surface 20 of the seal 12 to contact the shaft/runner surface 2 (and thus substantially eliminate the clearance space $S_C$ locally) is prevented as the larger opening 21 at the seal first end 14 ensures flow occurs about the entire circumference of the clearance space $S_C$.

Referring now to FIGS. 3-6, the seal 12 is configured such that a differential of at least a predetermined magnitude $\Delta P$ between fluid pressure $P_1$ on the seal outer surface 18 and fluid pressure $P_2$ on the seal inner surface 20 deflects at least the seal second axial end 16 radially inwardly to reduce the volume of the clearance space $S_C$. Preferably, the pressure differential $\Delta P$ has a magnitude of at least fifty pounds per square inch (50 psi), and most preferably between one hundred pounds per square inch (100 psi) and one thousand pounds per square inch (1000 psi). However, the seal 12 may be configured to radially deflect inwardly at a pressure differential of less than fifty pounds per square inch (50 psi) or even greater than one thousand pounds per square inch (1000 psi), depending on the particular application.

More specifically, the seal radial thickness $t_R$ is selectively sized to enable radially inward deflection of at least the seal second axial end 16 by the predetermined pressure differential $\Delta P$. That is, the seal 12 must have a radial thickness $t_R$ of at least a certain value/magnitude to provide sufficient rigidity to resist deflection by pressure differentials below the predetermined magnitude, in order to permit a desired fluid flow under certain operating conditions (i.e., shaft rotating in dynamic operation). At the same time, the seal thickness $t_R$ must not exceed a certain value so as to be sufficiently flexible to enable radial inward deflection at or above the predetermined pressure differential $\Delta P$ in order to reduce the flow path $p_F$ under other operating conditions (i.e., static or transition conditions).

Further, the seal 12 is preferably of two-piece construction and includes an inner annular body portion 22 having a radial thickness $t_1$ and an outer annular body portion 24 disposed about the inner body portion 22 and having a radial thickness $t_2$. The first and second body portion radial thicknesses $t_1$, $t_2$, respectively, collectively form the seal radial thickness $t_R$, as discussed above and in further detail below. More specifically, the inner body portion 22 is preferably formed as a generally circular ring 25 of a carbon graphite material, but may be formed of any other appropriate lubricious material. The outer body portion 24 is preferably formed as a generally circular ring 27 having L-shaped axial cross-sections, as discussed below, and is fabricated of a metallic material, most preferably steel or titanium. Further, the inner body portion 22 is preferably coupled with the outer body portion 24 by an interference fit, but may be bonded or otherwise joined to the outer body portion 24 by any other appropriate means (e.g., fasteners, adhesives, etc.).

With the preferred two-piece structure, the radial thickness $t_2$ of the metallic outer body portion 24 is particularly critical to providing the seal 12 with both the desired rigidity to resist deflection under dynamic operating conditions and also the capability of deflecting under certain static conditions, as discussed below. Preferably, the outer body portion 24 is sized so as to have a ratio of the body portion radial thickness $t_2$ to the seal second inner diameter $ID_2$ (FIG. 7), or a constant inner diameter value if not tapered, within the range of about five thousandths (0.005) to about seventeen thousandths (0.017). It has been determined through analysis that such a ratio of body portion thickness $t_2$ to inner diameter $ID_2$ provides both sufficient rigidity when required under dynamic shaft conditions and sufficient flexibility to deflect under static shaft conditions, and thereby also inwardly deflect the coupled inner body portion 22. However, it is possible that seals 12 having a ratio of outer body thickness $t_2$ to seal inner diameter $ID_2$ (or constant inner diameter) that falls outside of the desired range may also perform generally as described herein, although maybe not as ideally as those falling within the preferred range.

Figure 1:
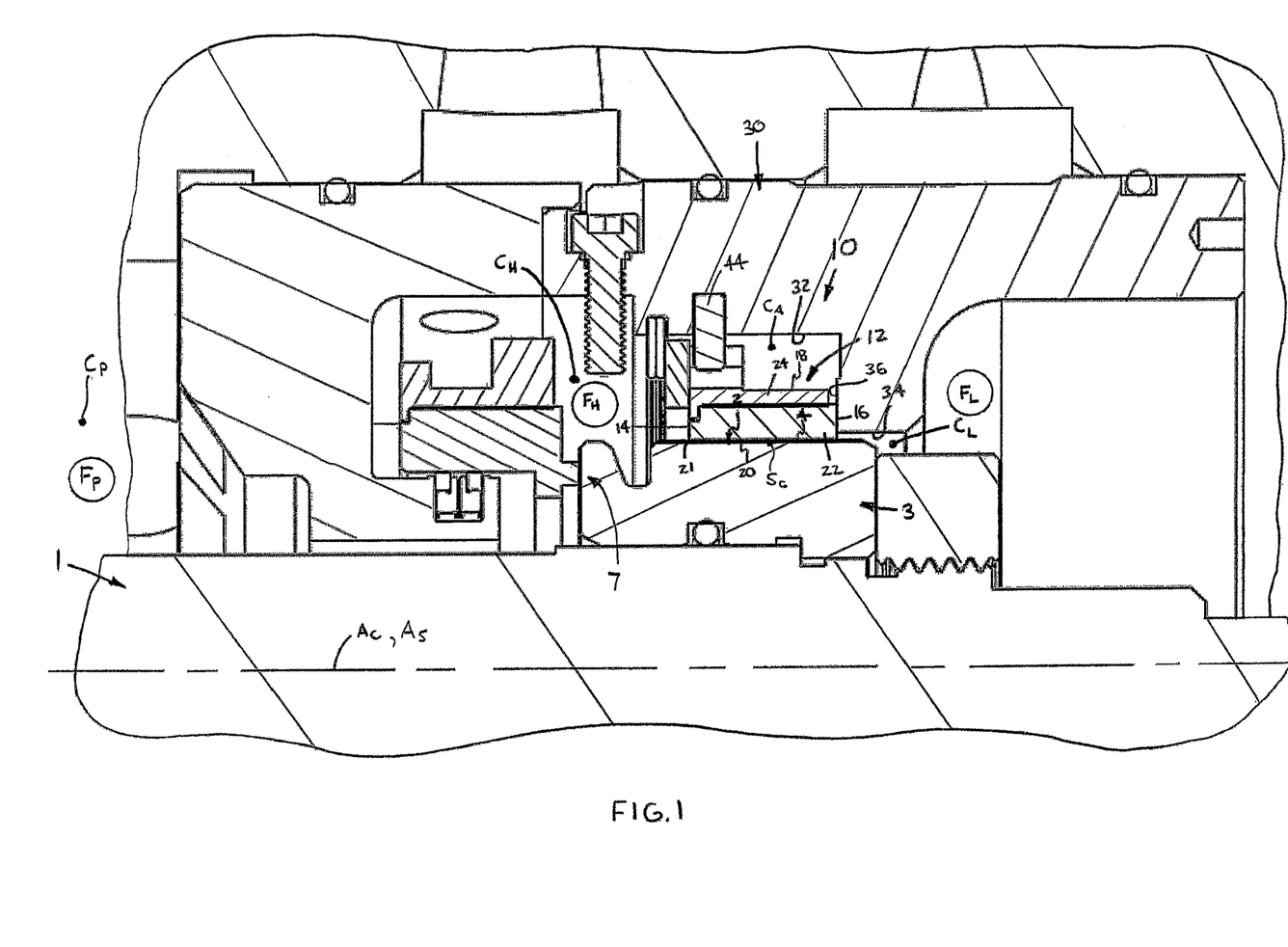
FIG. 1 is a broken-away, axial cross-sectional view of a seal assembly of the present invention, shown incorporated in a compressor.
Figure 2:
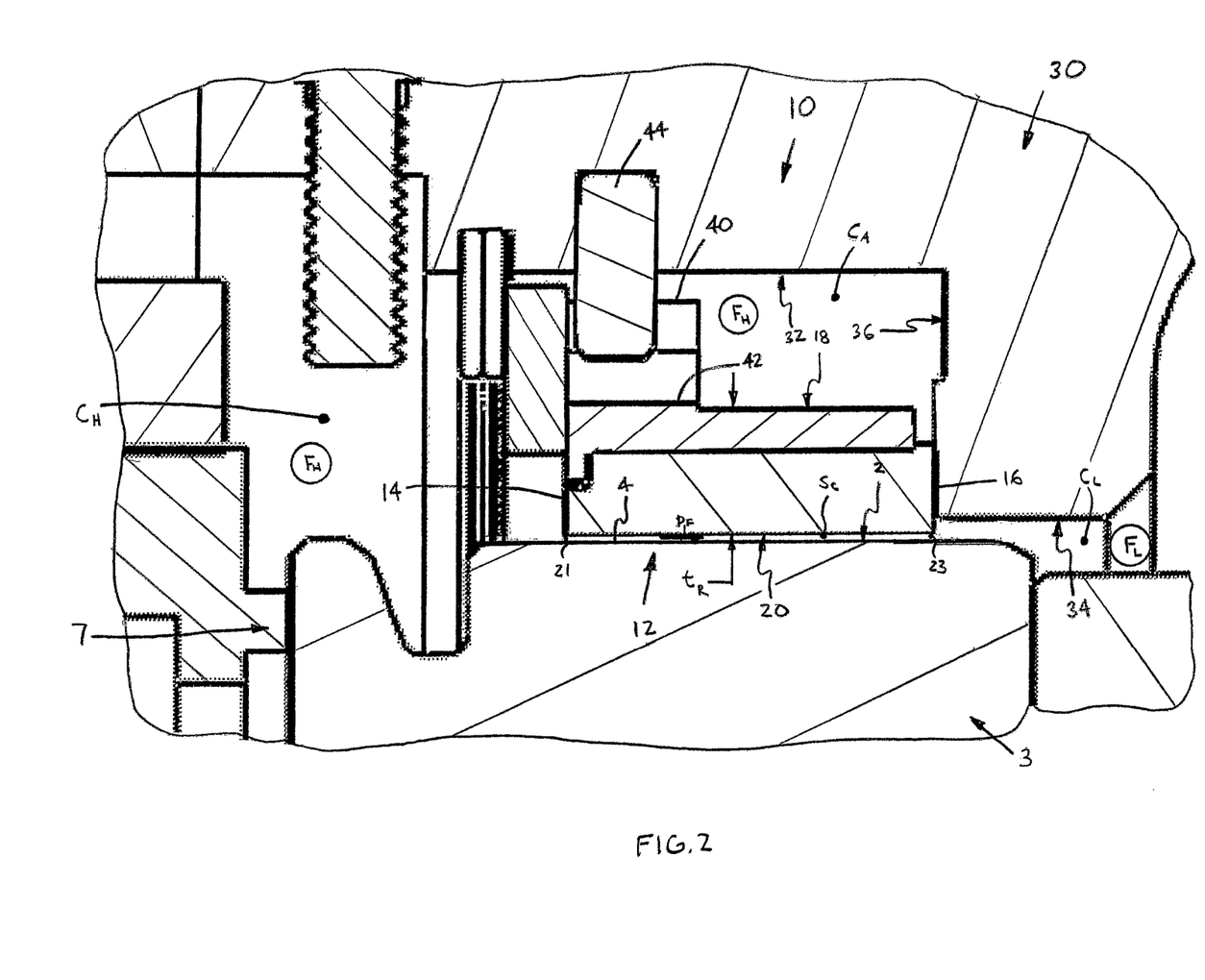
FIG. 2 is an enlarged portion of FIG. 1.
Figure 3:
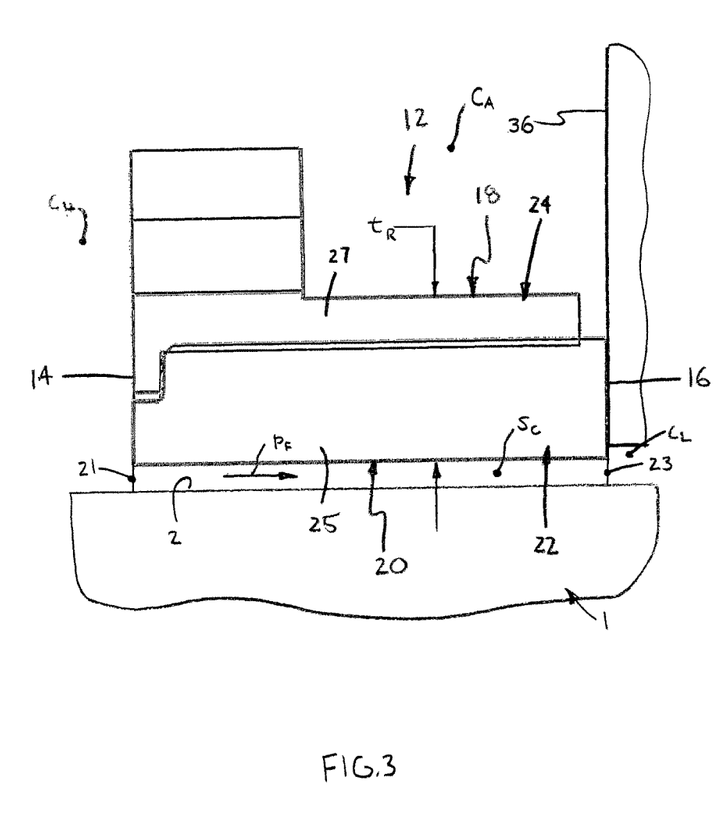
FIG. 3 is an enlarged axial cross-sectional view of a seal on a shaft, showing an undeflected state of the seal.
Figure 4:
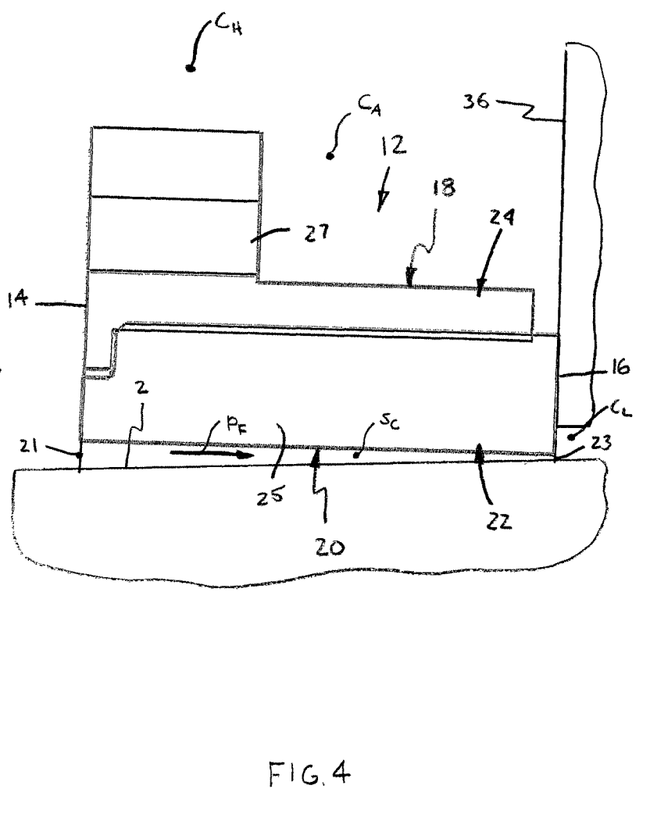
FIG. 4 is an enlarged axial cross-sectional view of the seal on a shaft, showing a deflected state of the seal.

Referring particularly to FIGS. 1 and 2, the seal assembly 10 preferably further comprises a housing 30, most preferably a component of a seal console of a compressor as discussed below, but may be incorporated into any other machine or even be separate from any other device, such that the seal assembly 10 is "stand alone". In any case, the housing 30 has at least a first inner circumferential surface 32 defining a higher pressure chamber $C_H$, a second inner circumferential surface 34 defining a lower pressure chamber $C_L$ and a radial surface 36 extending between the first and second inner circumferential surfaces 32, 34, respectively. With such a housing 30, the shaft 1 extends through the housing 30 and the seal 12 is disposed within the higher pressure chamber $C_H$ such that an actuation chamber section $C_A$ (i.e., part of the higher pressure chamber $C_H$) is defined between the seal outer surface 18 and the housing first inner surface 32. Also, the seal second axial end 16 is at least partially disposed against the housing radial surface 36 so as to substantially prevent direct fluid flow between the actuation chamber section $C_A$ and the lower pressure chamber $C_L$. Preferably, the seal 12 further includes a generally annular shoulder 40 extending generally radially outwardly from the outer circumferential surface 18, thus providing the presently desired L-shaped axial profile of the outer body portion ring 27. The shoulder 40 preferably has at least one slot 42 for receiving an anti-rotation pin 44 connectable with the housing 30 to fix the seal 12 with respect to the housing 30, and thus prevent rotation of the seal 12 about the axes $A_S$, $A_C$.

With the above housing structure, the seal 12 is configured such that at least the seal second axial end 16 deflects generally radially inwardly when fluid pressure $P_1$ in the actuation chamber section $C_A$ is at least a predetermined pressure or has a predetermined value, i.e., sufficient to create the predetermined pressure differential $\Delta P$. In other words, the seal 12 is exposed to fluid $F_H$ within the high pressure chamber $C_H$ on both the first axial end 14 and the outer circumferential surface 18, but only the pressure on the outer surface 18 acts to deflect the seal 12 radially inwardly. Instead, the fluid pressure $P_1$ on the first axial end 14 (not indicated) biases the seal 12 generally against the housing radial surface 36 to thereby prevent direct fluid flow between the actuation chamber section $C_A$ and the lower pressure chamber $C_L$.

Figure 5:
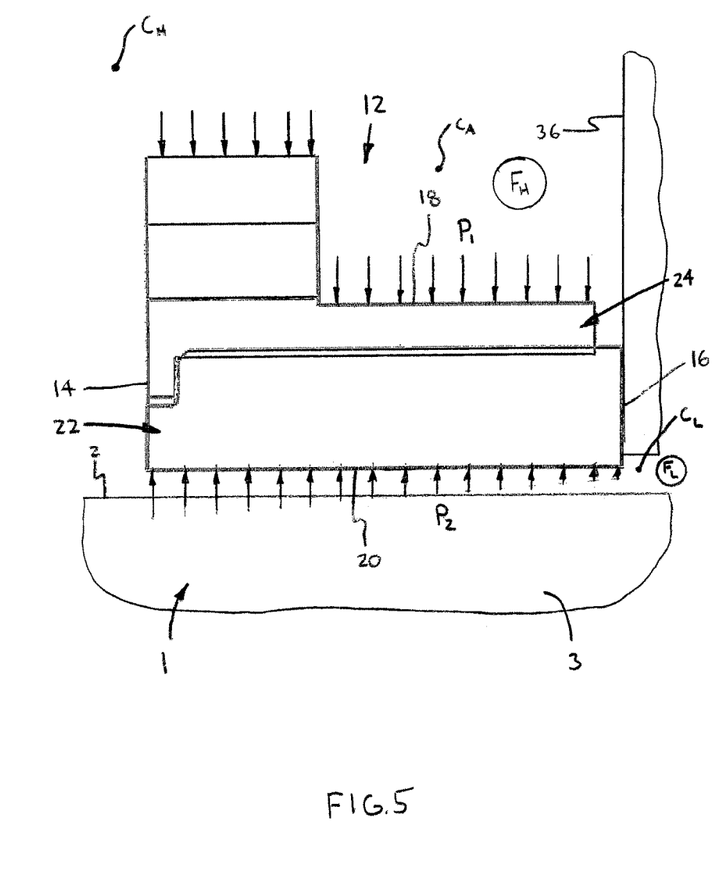
FIG. 5 is an enlarged axial cross-sectional view of a seal on a shaft, depicting the radial components of pressure applied to the seal in a lower pressure state of the seal assembly.
Figure 6:
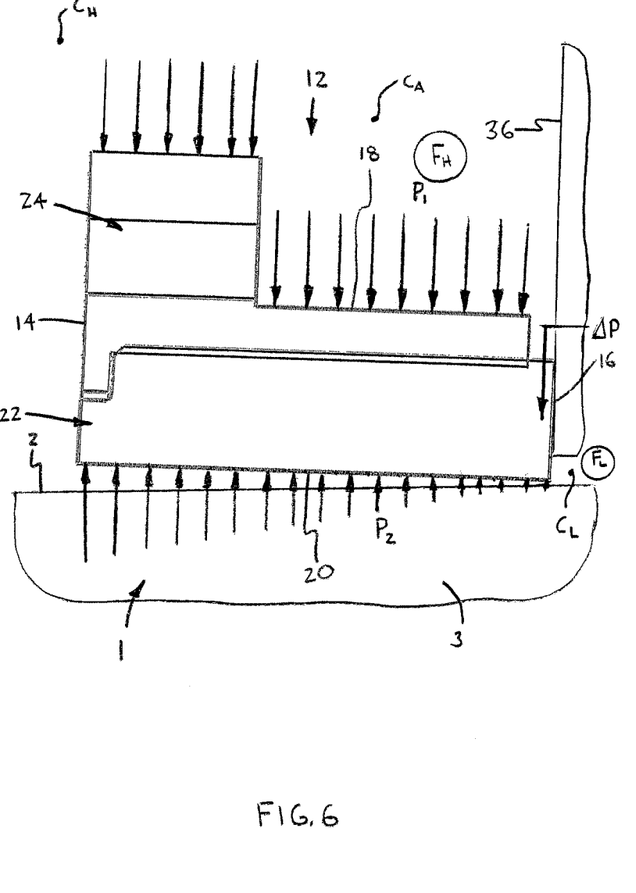
FIG. 6 is an enlarged axial cross-sectional view of the seal on a shaft, depicting the radial components of pressure applied to the seal in a higher pressure state of the seal assembly.

Additionally, fluid pressure $P_2$ on the seal inner surface 20 varies axially from a first, higher pressure $P_H$ at the seal first axial end 14 to a second, lower pressure $P_L$ at the seal second axial end 16, as indicated in FIGS. 5 and 6. As such, the full magnitude of the pressure differential $\Delta P$ between the high pressure fluid $F_H$ and the low pressure fluid $F_L$ is only exerted proximal to the seal second axial end 16 and the differential $\Delta P$ has a magnitude of about zero at the first axial end 14. Thus, the largest amount or extent of radial deflection of the seal 12 occurs proximal to the seal second end 16 and the deflection is not uniform along the axial length $l_A$ (FIG. 7), although the seal 12 preferably deflects generally linearly between the axial ends 14, 16, with essentially zero deflection at the first axial end 14. Further, the seal 12 is configured such that radially inward deflection of at least the seal second end 16 reduces fluid flow between the higher pressure chamber $C_H$ and the lower pressure chamber $C_L$.

For example, in one intended application, the seal assembly 10 is used as a secondary seal in a compressor (not depicted) within which the higher pressure fluid $F_H$ is oil (or a similar intermediate fluid) that provides a barrier between process fluid $F_P$ and atmospheric air providing the lower pressure fluid $F_L$. More specifically, the primary seal is a radial face seal 7 located between the process chamber $C_P$ and the higher pressure chamber $C_H$, with the seal assembly 10 providing the secondary seal about the shaft/runner 4. Under dynamic operating conditions, the shaft 1 is rotating as the compressor functions to compress the process fluid $F_P$, and the seal 12 permits a certain volume of fluid $F_H$ to flow through the clearance space $S_C$ to lubricate the interface between the shaft 1 and seal 12 (preferably between runner outer surface 4 and seal inner surface 20). During this state, the pressure $P_1$ of the intermediate sealing fluid/oil $F_H$ is relatively lesser than during other conditions, for example in the range of about four hundred thirty pounds per square inch (430 psi) and about four hundred forty-five pounds per square inch (445 psi).

However, as the compressor stops operation (i.e., shuts off), the compressor transitions or "settles out" between the dynamic state and a static or non-operational state, during which the pressure $P_1$ in the higher pressure chamber $C_H$ tends to increase significantly (at least temporarily), for example, from 430-445 psi to over eight hundred pounds per square inch (800 psi). With the seal assembly 10 of the present invention, at least the outer axial end 16 of the seal 12 is configured to deflect radially inwardly under the increased magnitude of the pressure $P_1$ to reduce the clearance space $S_C$ in order to minimize or at least reduce oil flow along the flow path $p_F$. In contrast, with prior seal designs, this increased pressure increases the oil flow through a similar clearance space, which necessitates the use of larger pumps, oil filters, line sizes, etc., therefore making prior seal oil consoles substantially more expensive.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A seal assembly for sealing about a shaft rotatable about a central axis, the shaft having an outer surface, the seal assembly comprising:
a generally annular seal disposable about the shaft and having a first axial end exposable to a relatively higher pressure fluid, an opposing second axial end exposable to a relatively lower pressure fluid, an outer circumferential surface exposable to the higher pressure fluid and an inner circumferential sealing surface, the inner circumferential sealing surface extending circumferentially about the shaft so as to define a generally annular clearance space between the shaft outer surface and the seal inner circumferential sealing surface, the clearance space providing a flow path between the seal first and second axial ends, the seal having a radial thickness defined between the seal inner circumferential sealing surface and the outer circumferential surface, the seal radial thickness being selectively sized such that a differential of at least a predetermined magnitude between a greater fluid pressure on the seal outer circumferential surface and a lesser fluid pressure on the seal inner circumferential sealing surface deflects at least the seal second axial end radially inwardly to reduce the volume of the clearance space.

2. The seal assembly as recited in claim 1 wherein the pressure differential is at least fifty pounds per square inch (50 psi).

3. The seal assembly as recited in claim 2 wherein the pressure differential is between one hundred pounds per square inch (100 psi) and one thousand pounds per square inch (1000 psi).

4. The seal assembly as recited in claim 1 wherein the seal includes an inner body portion formed of one of carbon graphite and another lubricious material and having a radial thickness and an outer body portion disposed about the inner body portion, formed of a metallic material and having a radial thickness, the first and second body portion radial thicknesses collectively forming the seal radial thickness.

5. The seal assembly as recited in claim 4 wherein the outer body portion is formed of one of steel and titanium.

6. The seal assembly as recited in claim 1 wherein the seal has an inner diameter and the ratio of the outer body portion radial thickness to the seal inner diameter is within a range of about 0.005 and about 0.017.

7. The seal assembly as recited in claim 1 wherein the inner body portion is coupled with the outer body portion by an interference fit.

8. The seal assembly as recited in claim 1 further comprising a housing having a first inner circumferential surface defining a higher pressure chamber, a second inner circumferential surface defining a lower pressure chamber and a radial surface extending between the first and second inner circumferential surfaces, the shaft extending through the housing and the seal being disposed within the higher pressure chamber such that an actuation chamber section is defined between the seal outer surface and the housing inner surface, the seal second axial end being at least partially disposed against the radial surface so as to substantially prevent fluid flow between the actuation chamber section and the lower pressure chamber.

9. The seal assembly as recited in claim 8 wherein the seal is configured such that at least the seal second axial end deflects generally radially inwardly when fluid pressure in the actuation chamber section is at least a predetermined pressure.

10. The seal assembly as recited in claim 8 wherein the seal is configured such that radially inward deflection of at least the seal second end reduces fluid flow between the higher pressure chamber and the lower pressure chamber.

11. The seal assembly as recited in claim 8 wherein the seal includes a shoulder extending generally radially outwardly from the outer circumferential surface and having at least one slot for receiving an anti-rotation pin connectable with the housing.

12. The seal assembly as recited in claim 1 wherein fluid pressure on the seal inner surface varies axially from a first, higher pressure at the seal first axial end to a second, lower pressure at the seal second axial end.

13. The seal assembly as recited in claim 1 wherein the seal inner surface tapers radially inwardly from a first, relatively larger inner diameter proximal to the first axial end and a second, relatively smaller inner diameter at the seal second axial end such that pressure on the seal inner surface generally centers the seal about the shaft central axis.

14. A seal assembly for sealing about a shaft rotatable about a central axis, the shaft extending between a high pressure fluid and a low pressure fluid, the seal assembly comprising:

a generally annular seal disposable about the shaft and having a first end exposable to the high pressure fluid, an opposing second end exposable to the low pressure fluid, an inner circumferential sealing surface extending circumferentially about the shaft so as to define a generally annular clearance space between the shaft outer surface and the seal inner surface, and an opposing outer circumferential surface, the seal having a radial thickness defined between the inner and outer surfaces, the radial thickness being selectively sized such that a differential of at least a predetermined magnitude between a greater fluid pressure on the seal outer surface and a lesser fluid pressure on the seal inner sealing surface deflects at least the seal second axial end radially inwardly to reduce the volume of the clearance space.

\* \* \* \* \*